United States Patent
Tseng

(10) Patent No.: US 8,899,772 B2
(45) Date of Patent: Dec. 2, 2014

(54) LIQUID CRYSTAL DISPLAY DEVICE WITH BRIGHTNESS ADJUSTMENT

(71) Applicant: Hon Hai Precision Industry Co., Ltd., New Taipei (TW)

(72) Inventor: Yung-Chang Tseng, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 20 days.

(21) Appl. No.: 13/851,914

(22) Filed: Mar. 27, 2013

(65) Prior Publication Data

US 2014/0204314 A1    Jul. 24, 2014

(30) Foreign Application Priority Data

Jan. 24, 2013 (TW) ................. 102102552

(51) Int. Cl.
*F21V 8/00* (2006.01)
*G02F 1/1335* (2006.01)

(52) U.S. Cl.
CPC ............ *G02B 6/0061* (2013.01); *G02F 1/1336* (2013.01); *G02B 6/0036* (2013.01)
USPC ........................................ 362/97.2

(58) Field of Classification Search
CPC ........ F21V 8/00; G02B 6/0061; G02B 6/001; G02B 6/0018; G02B 6/0036; G02B 6/0038; G02F 1/1336; G02F 1/133615
See application file for complete search history.

(56) References Cited

U.S. PATENT DOCUMENTS

| | | | | |
|---|---|---|---|---|
| 5,584,556 A * | 12/1996 | Yokoyama et al. | ........... | 362/625 |
| 6,485,157 B2 * | 11/2002 | Ohkawa | ........... | 362/625 |
| 7,101,070 B2 * | 9/2006 | Yu et al. | ........... | 362/558 |
| 7,366,392 B2 * | 4/2008 | Honma et al. | ........... | 385/146 |
| 7,839,091 B2 * | 11/2010 | Kohashikawa et al. | ........ | 315/151 |
| 8,008,874 B2 * | 8/2011 | Kitamura et al. | ........... | 315/309 |
| 8,199,276 B2 * | 6/2012 | Lee et al. | ........... | 349/58 |
| 8,231,257 B2 * | 7/2012 | Griffiths et al. | ........... | 362/605 |
| 8,363,005 B2 * | 1/2013 | Hsieh et al. | ........... | 345/102 |
| 8,643,803 B2 * | 2/2014 | Miyazaki et al. | ........... | 349/58 |
| 2004/0076396 A1 * | 4/2004 | Suga | ........... | 385/146 |
| 2009/0140656 A1 * | 6/2009 | Kohashikawa et al. | ........ | 315/151 |

* cited by examiner

*Primary Examiner* — Bao Q Truong
(74) *Attorney, Agent, or Firm* — Novak Druce Connolly Bove + Quigg LLP

(57) ABSTRACT

An LCD device includes a backlight module, a liquid crystal layer, a brightness detecting module and a control unit. The backlight module includes a light guide plate and light sources. The light guide plate includes a light-mixing part and a light-homogenized part. Protrusions are positioned on the light guide plate. A density of the protrusions in the light-mixing part is greater than that in the light-homogenized part. The liquid crystal layer includes an adjustable part corresponding to the light-mixing part and a nonadjustable part corresponding to the light-homogenized part. The brightness detecting module acquires a brightness distribution data of the liquid crystal layer. The control unit makes a brightness of the adjustable part coincide with a brightness of the nonadjustable part according to the brightness distribution data.

5 Claims, 2 Drawing Sheets

LIQUID CRYSTAL DISPLAY DEVICE WITH BRIGHTNESS ADJUSTMENT

BACKGROUND

1. Technical Field

The present disclosure relates to a liquid crystal display device.

2. Description of Related Art

A backlight module used in a liquid crystal display (LCD) device usually includes a light guide plate and a number of light sources positioned adjacent to a light incident surface of the light guide plate. The light guide plate includes a light-mixing part adjacent to the light sources. The light sources are spaced from each other. As a result, dark areas exist at the light-mixing part between each two light sources and make the brightness of the LCD device non-uniform.

Therefore, it is desirable to provide an LCD device which can overcome the limitations described.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
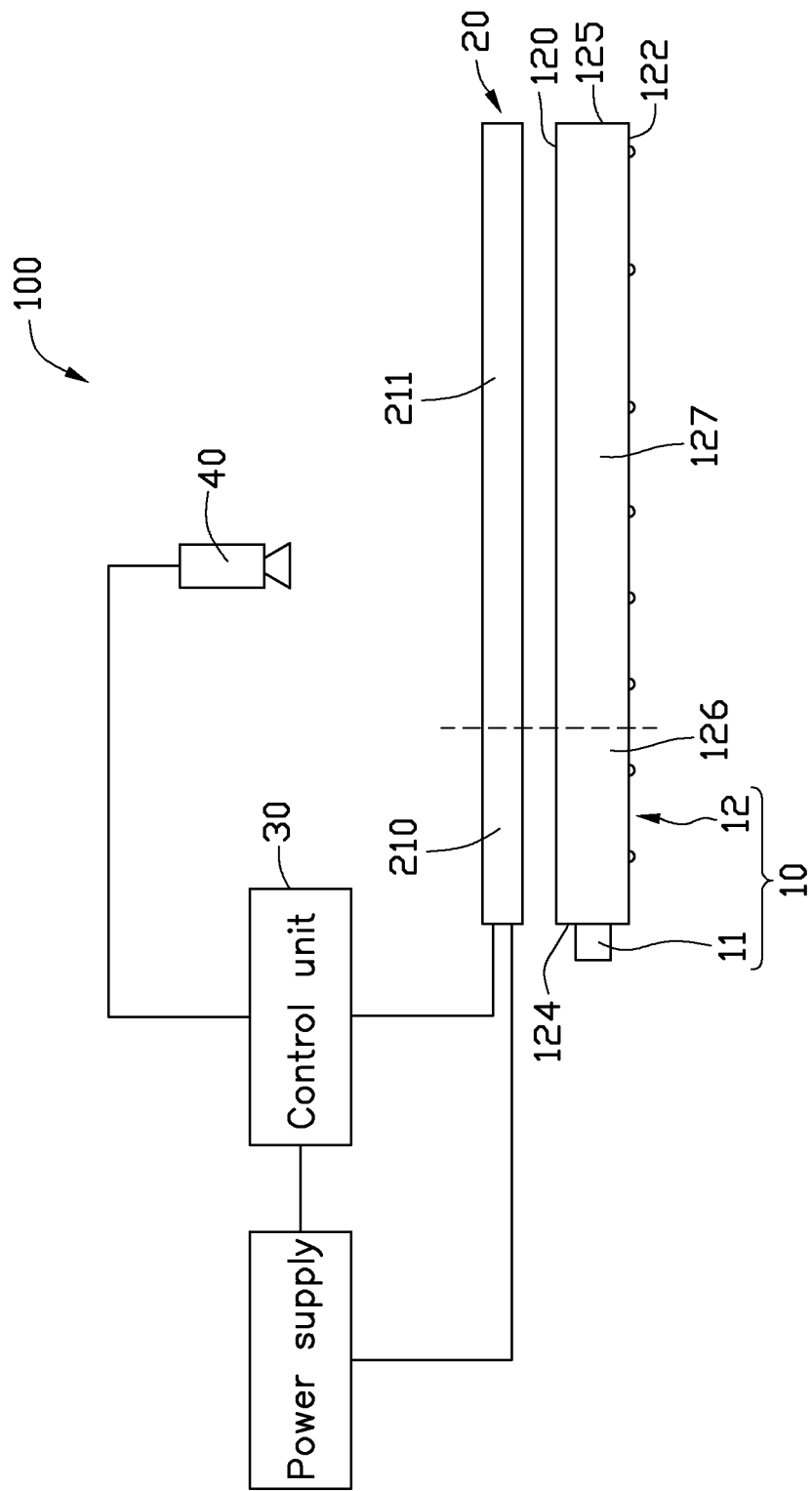
FIG. 1 is a schematic view of an LCD device according to an exemplary embodiment of the present disclosure.

FIG. 1 shows an LCD device 100 according to an exemplary embodiment. The LCD device 100 includes a backlight module 10, a liquid crystal layer 20, a control unit 30. a brightness detecting module 40, and a power supply 50.

The backlight module 10 includes a number of light sources 11 and a light guide plate 12. In this embodiment, the light sources 11 are light emitting diodes (LEDs).

The light guide plate 12 includes a light emitting surface 120, a bottom surface 122 opposite to the light emitting surface 120, a light incident surface 124 perpendicularly connected to the light emitting surface 120 and the bottom surface 122, and a side surface 125 opposite to the light incident surface 124. The light sources 11 are spaced from each other and positioned adjacent to the light incident surface 124. Light emitted from the light sources 11 enters the light guide plate 12 from the light incident surface 124 and is transmitted towards the side surface 125. The light guide plate 12 includes a light-mixing part 126 adjacent to the light sources 11 and a light-homogenized part 127 away from the light sources 11 relative to the light-mixing part 126.

Figure 2:
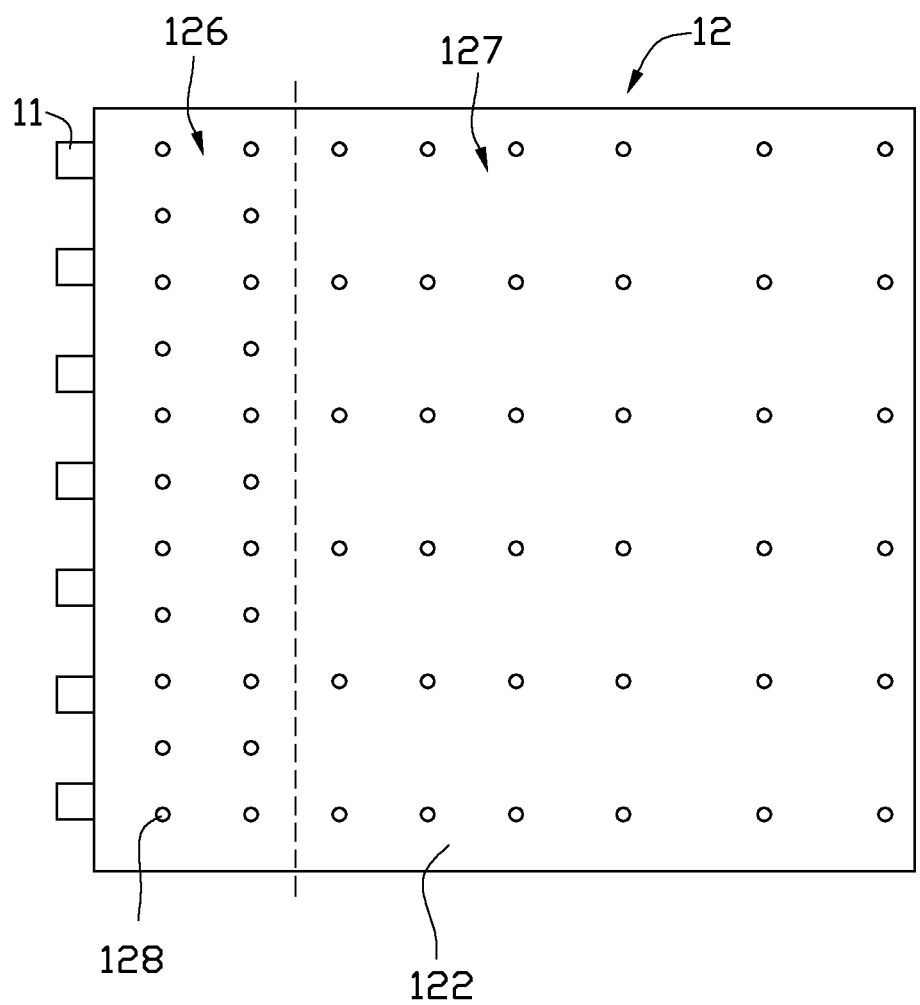
FIG. 2 is a bottom view of the LCD device of FIG. 1.

FIG. 2 shows that network protrusions 128 are formed on the bottom surface 122. The network protrusions 128 are configured for destroying a total reflection of a part of the light and thus the part of the light is transmitted out of the light guide plate 12 from the light emitting surface 120. A density of the network protrusions 128 at the light-mixing part 126 is greater than a density of the network protrusions 128 at the light-homogenized part 127, and more light is transmitted out of the light guide plate 12 at the light-mixing part 126 than at the light-homogenized part 127. As a result, a brightness of the light-mixing part 126 is greater than a brightness of the light-homogenized part 127. As the light-mixing part 126 is adjacent to the light sources 11, dark areas exist between each two light sources 11 at the light-mixing part 126, and the brightness of the light-mixing part 126 is non-uniform. As the light-homogenized part 127 is away from the light sources 11, light from different light sources 11 has been mixed with each other and is evenly dispersed at the light-homogenized part 127, for uniform brightness.

The liquid crystal layer 20 is positioned above the light guide plate 12. Light emitted form the light guide plate 12 is transmitted through the liquid crystal layer 20. The liquid crystal layer 20 includes a lot of liquid crystal molecules. When voltages applied to the liquid crystal layer 20 are changed, deflection angles of the liquid crystal molecules are changed, and a light transmission ratio of the liquid crystal layer 20 is also changed. Thus, by adjusting the voltages applied to the liquid crystal layer 20, the brightness of the liquid crystal layer 20 can be adjusted.

The liquid crystal layer 20 includes an adjustable part 210 corresponding to the light-mixing part 126 and a nonadjustable part 211 corresponding to the light-homogenized part 127. As the brightness of the light-homogenized part 127 is uniform, the brightness of the nonadjustable part 211 does not need to be adjusted. As the brightness of the light-mixing part 126 is non-uniform, the brightness of the adjustable part 210 needs to be adjusted to be uniform.

In this embodiment, the brightness detecting module 40 includes a charge-coupled device (CCD). The brightness detecting module 40 captures an image of the liquid crystal layer 20, analyzes the image to obtain a brightness distribution data of the liquid crystal layer 20 and sends the brightness distribution data to the control unit 30.

The control unit 30 receives the brightness distribution data; obtains and sets the brightness of the nonadjustable part 211 as a reference brightness, compares the brightness of the adjustable part 210 to the reference brightness. In addition, the control unit 30 obtains an adjusting voltage needed to adjust the brightness of the adjustable part 210 to the reference brightness, and controls the power supply 50 to apply the adjusting voltage to the adjustable part 210. In this way, the brightness of the adjustable part 210 is adjusted to be uniform and coincides with the brightness of the nonadjustable part 211.

According to the brightness distribution data acquired by the brightness detecting module 40, different portions of the liquid crystal layer 20 which have different brightness may be applied different voltages.

It will be understood that the above particular embodiments are shown and described by way of illustration only. The principles and the features of the present disclosure may be employed in various and numerous embodiments thereof without departing from the scope of the disclosure. The above-described embodiments illustrate the scope of the disclosure but do not restrict the scope of the disclosure.

What is claimed is:

1. An LCD device comprising:
 a backlight module comprising:
  a light guide plate comprising a light emitting surface, a bottom surface opposite to the light emitting surface, and protrusions on the bottom surface, the light guide plate comprising a light-mixing part and a light-homogenized part connected to the light-mixing part, wherein a density of the protrusions in the light-mixing part is greater than a density of the protrusions in the light-homogenized part; and
  a plurality of light sources positioned adjacent to the light-mixing part and away from the light-homogenized part relative to the light-mixing part;

a liquid crystal layer positioned above the light emitting surface, and comprising an adjustable part corresponding to the light-mixing part and a nonadjustable part corresponding to the light-homogenized part;

a brightness detecting module configured for acquiring a brightness distribution data of the liquid crystal layer; and a control unit configured for obtaining the brightness distribution data from the brightness detecting module and adjusting a brightness of the adjustable part to make the brightness of the adjustable part coincide with a brightness of the nonadjustable part according to the brightness distribution data.

2. The LCD device of claim 1, wherein the light guide plate comprises a light incident surface connecting the light emitting surface to the bottom surface, and the light sources are adjacent to the light incident surface.

3. The LCD device of claim 1, wherein the light sources are LEDs.

4. The LCD device of claim 1, wherein the light sources are spaced to each other.

5. The LCD device of claim 1, wherein the control unit sets the brightness of the nonadjustable part as a reference brightness, compares the brightness of the adjustable part to the reference brightness, obtains an adjusting voltage needed to adjust the brightness of the adjustable part to the reference brightness, and controls a power supply to apply the adjusting voltage to the adjustable part.

* * * * *